United States Patent [19]

Hitzler

[11] Patent Number: 4,829,781
[45] Date of Patent: May 16, 1989

[54] APPLIANCE FOR PURIFYING AND/OR HUMIDIFYING AND DEHUMIDIFYING GASES, ESPECIALLY AIR

[75] Inventor: Alfred Hitzler, Mochenwangen, Fed. Rep. of Germany

[73] Assignee: Venta Industrieanlagen GmbH, Weingarten, Fed. Rep. of Germany

[21] Appl. No.: 1,867

[22] Filed: Jan. 9, 1987

[30] Foreign Application Priority Data

Jan. 21, 1986 [DE] Fed. Rep. of Germany ....... 3601628
Sep. 3, 1986 [DE] Fed. Rep. of Germany ....... 3629916

[51] Int. Cl.$^4$ .............................................. F28D 5/00
[52] U.S. Cl. ......................................... 62/311; 62/171
[58] Field of Search .................. 62/311, 309, 304, 171

[56] References Cited

U.S. PATENT DOCUMENTS 2,177,869 10/1939 Crawford ............................. 62/311
2,302,807 11/1942 Shoeld .
2,703,228 3/1955 Fleisher ................................. 62/311
3,926,008 12/1975 Webber .

FOREIGN PATENT DOCUMENTS 2005852 10/1970 Fed. Rep. of Germany .
1778268 8/1972 Fed. Rep. of Germany .
2304385 10/1976 France .
2421345 10/1979 France .

Primary Examiner—Henry A. Bennet
Attorney, Agent, or Firm—Spencer & Frank

[57] ABSTRACT

An appliance for purifying, humidifying or dehumidifying, cooling or heating gases, especially room air, and in it purification is carried out by means of a plate stack rotating in a liquid. To regulate or vary the air humidity, the incoming air is conveyed through an evaporator and the purified outgoing air is conveyed through a condenser of a refrigerant circuit. The effectiveness of the condenser is influenced by an additional condenser.

20 Claims, 2 Drawing Sheets

APPLIANCE FOR PURIFYING AND/OR HUMIDIFYING AND DEHUMIDIFYING GASES, ESPECIALLY AIR

BACKGROUND OF THE INVENTION

The invention relates to an appliance and a process for purifying, humidifying or dehumidifying, cooling or heating gases, especially room air, with at least one plate stack which is arranged in a housing, partially dips into a liquid, rotates about a horizontal axis and can be wetted by the liquid.

Appliances for purifying and/or humidifying gases, especially room air, are known, for example, from German Utility Model No. G8134160.1 or from German Pat. No. 3,308,871 of the inventor. Express reference is made to these as regards the design and mode of operation of these appliances. In particular, attention is drawn to the possibility of air purification and humidification by means of a plate stack rotating in a liquid. The slowly rotating disks of the plate stack are constantly wetted, so that both air purification by adsorption and air humidification can take place.

Messrs. Defensor AG, Zürich, has made known under the brand name, Air Humidifier 5000-V, an air humidifier for horizontal ducts, which can be operated in conjunction with air heaters, warm-air heating systems, air-conditioning systems, etc. For this purpose, the appliance working on the evaporator principle is flanged to a duct, so that the rotating plates giving off moisture project into the duct. As a result, the air conducted through the duct from an air heater, a warm-air heating system or an air-conditioning system can be humidified. According to the assembly instructions for this known air humidifier, it should, if possible, be fitted so as to follow an air heater, a hygrostatic control being provided to keep the relative air humidity constant, the air humidity being measured at the inlet of the appliance and, depending on the measured value, the air being humidified or not by means of the rotating plate stack.

The disadvantage of the known appliance is that it is only operated in conjunction with existing air heaters, warm-air heating systems or air-conditioning systems, and the air humidity and air temperature can only be regulated or influenced inadequately by means of the preceding air heater and the additional air humidifier.

SUMMARY OF THE INVENTION

An object of the invention is to eliminate the disadvantages mentioned above and to provide a compact appliance both for purifying and for influencing the air humidity and air temperature. At the same time, the appliance according to the invention will form a self-contained unit which is not necessarily in cooperation with other air heaters, warm-air heating systems or air-conditioning systems. In addition to the possibility of purification according to the known appliances mentioned in the introduction, it will additionally provide the possibility of controlled air humidification and air dehumidification and of influencing the air temperature. A further object of the invention is to provide an appropriate process for treating gases or room air.

Starting from an appliance of the type mentioned in the introduction, this object is achieved, according to the invention, by providing such an appliance wherein an evaporator is provided for cooling the gas sucked in by the appliance, the gas being cooled directly at the evaporator itself or indirectly via the cooled liquid at the plate stack and wherein a condenser for possible gas heating is provided in the gas-outflow region of the appliance, the relative humidity and/or the temperature of the gas flowing out of the appliance being regulatable as a function of the cooling of the gas in the evaporator or at the plate stack and/or the heating of the gas in the condenser. The further object is achieved by providing a process wherein the incoming air is cooled directly or indirectly by means of an evaporator of a refrigerant circuit and is purified by means of a plate stack rotating in a purifying liquid, harmful substances and moisture being extracted from the air, and wherein the air purified and dehumidified in this way can be heated by means of a condenser of the refrigerant circuit and the outflow temperature of the outgoing air and consequently the final humidity can be regulated, an additional condenser being provided for the refrigerant circuit in order to eliminate the residual heat.

The essential idea on which the invention is based is that, in addition to the desired purification effect, the appliance must also carry out a controlled regulation of the gas humidity. If unsaturated gas (hereinafter referred to as "air") at room temperature is made to flow past a plate stack wetted with liquid, air humidification basically takes place on the cold-evaporation principle as a result of the absorption of liquid. At the same time, depending on the contents of harmful substances in the air, simple water or water with additional known adsorption or purification agents can serve as the purifying liquid.

In specific rooms, however, it may be necessary for basic purification to take place without an additional increase in the air humidity. In this case, the known appliance according to Defensor can be switched on or off by means of the hygrostat.

According to the present invention, however, in addition to the purification process the air is cooled to a greater or lesser extent, so that the air, for example when it is taken up in the purification process, is saturated, if appropriate to 100%, by means of the plate stack and cannot absorb any additional moisture. During further cooling below the dew point, the air even gives out condensation water. After the purification process by means of the plate stack, the air can be heated and thereby brought to the original air temperature.

According to the invention, it is expedient to assign a refrigerator unit to the known purification process by means of a plate stack. The air humidity, air temperature and degree of purification can thereby be influenced by varying the individual components of the appliances according to the invention, such as the evaporator and condenser of the refrigerant circuit, and the dwell time along the purification plates.

In principle, the air can be cooled at various locations in the appliance. This is carried out either directly in the air-inflow region by means of an evaporator or indirectly via the cooled purifying liquid directly at the plate stack. The advantage of the latter is that there is no condensation and therefore no formation of dirt on the evaporator. The plate stack then serves at the same time as a purification surface, cooling surface and, if appropriate, condensation surface.

In the process according to the invention, the cooled room air is purified and is subsequently conveyed into the environment either heated or directly. In the latter case, the refrigerant circuit must have an additional condenser for liquefying the refrigerant. The heat emitted in this additional condenser can then, if appropriate, be eliminated in another way.

As a result of the further measures advantageous developments and improvements of the appliance described above claim are possible.

In accordance with one embodiment, an evaporator of a refrigerant circuit for gas cooling is provided in the gas-inflow region of the appliance, wherein, in the direction of gas conveyance in the appliance, the evaporator is followed by the rotating plate stack for gas purification and this is followed, in the gas-outflow region of the appliance, by a condenser of the rerigerant circuit for gas heating, and wherein the relative humidity of the gas flowing out of the appliance is variable as a function of the cooling of the gas in the condenser of the refrigerant circuit.

In accordance with another embodiment, for the indirect cooling of the incoming air via the plate stack, the evaporator is arranged in the liquid for cooling the liquid.

According to one feature of the invention, the cooling of the air supplied to the appliance according to the invention by means of the evaporator and the heating of the outgoing air heated in the condenser or liquefier can be measured and appropriately regulated. As a result, any desired air humidification or dehumidification and any regulation of the air temperature can be set.

According to the design of the invention wherein there is a refrigerant circuit consisting of an evaporator for influencing the gas flowing into the appliance, a compressor following in the direction of flow of the refrigerant, a condenser arranged in the gas-outflow region, and a restrictor following the said condenser, the refrigerant circuit consists in a way known per se of an evaporator, a following compressor, a condenser or liquefier and a restrictor following the latter.

In a modification of the invention according to a further additional condenser with a heat exchanger and a cooling-water regulator for the refrigerant is connected in parallel with the condenser, and the condenser can be disconnected from the refrigerant circuit by means of a shut-off valve in the gas-out-flow region of the appliance, the compressor being connected to the additional condenser via a connecting line. In this modification, in the air-outflow region of the appliance the condenser or liquefier is not included in the refrigerant circuit and consequently does not influence the outflowing air, so that an additional condenser or liquefier is provided for the refrigerant, the heat of which is eliminated by means of a separate cooling-water control system. In this case, the air flowing out of the appliance is not heated to the initial level again.

In the feature of the invention wherein the appliance has an automatic adding and/or dispensing device for absorbent liquid and/or purifying liquid or purifier, the liquid in the liquid tank of the appliance according to the invention is kept constant by means of a water-level regulator. An automatic water inflow and flow-off serves for regulating the water level and for changing the water.

Furthermore, according to the invention, an automatic adding and/or dispensing device for the absorbent liquid or other purifying agent is provided.

BRIEF DESCRIPTION OF THE DRAWINGS

Advantageous and expedient exemplary embodiments of the invention are illustrated in the drawings and described in detail in the following description. In the drawings.

DESCRIPTION OF THE PREFERRED EMBODIMENTS

Figure 1:
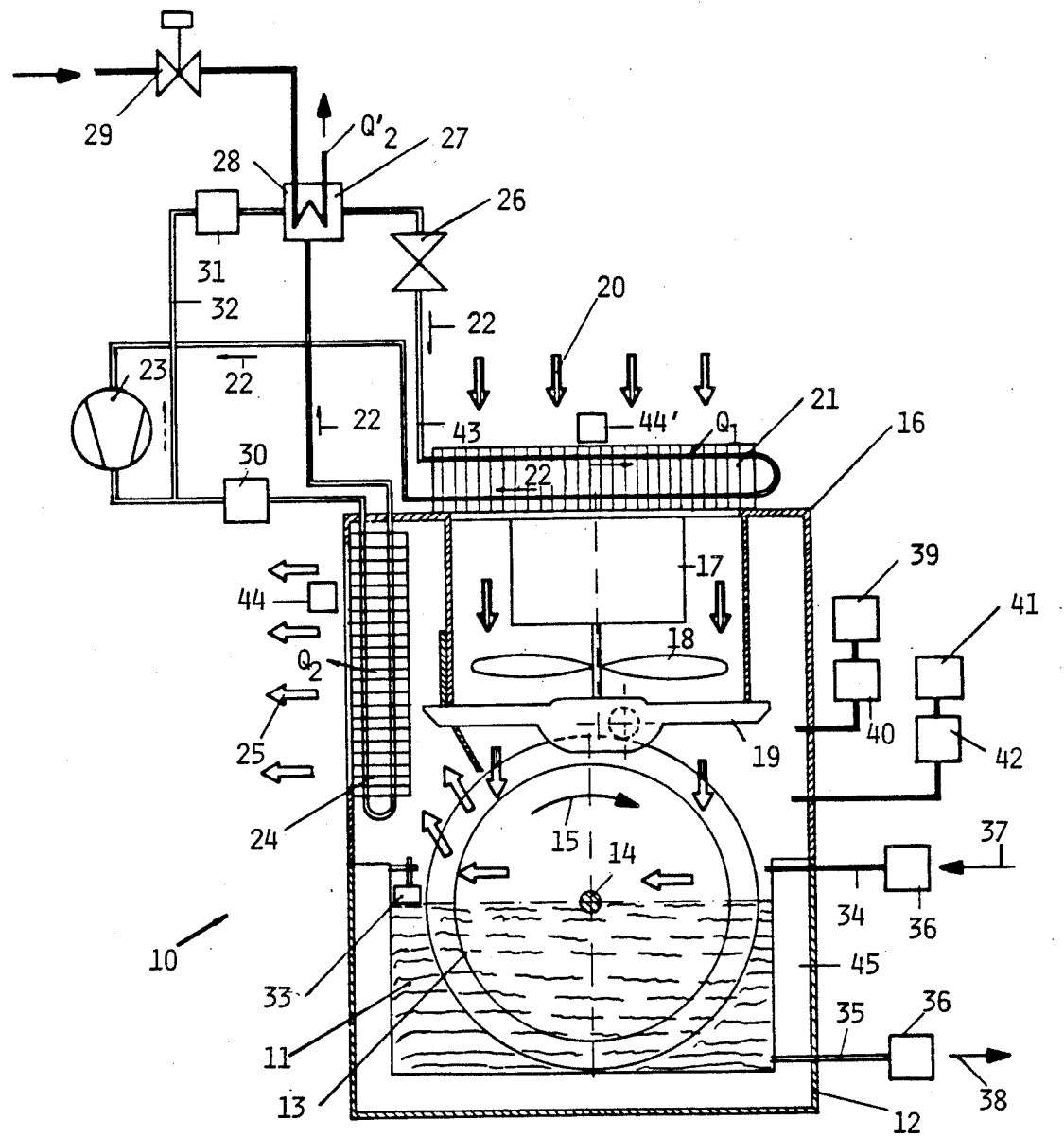
FIG. 1 shows a longitudional section through a diagrammatically represented appliance according to the invention with an evaporator in the air-inflow region.

The invention is first described in principle with reference to FIG. 1: the appliance (10) according to the invention has a housing bottom part (12) which contains liquid (11) and in which a plate stack (13) partially dipping into the liquid rotates by means of a horizontal axle (14) (Arrow 15).

The housing top part (16) contains a drive motor (17) for a fan (18) and a drive (19) for the plate stack (13).

The above design is known from German Utility Model GM 8134160 or German Patent Specification No. 3,308,871. The inflowing air (20) can be purified or humidified accordingly by means of the appliance according to the invention.

According to the invention, an additional refrigerant circuit is assigned to the appliance (10) and consists of an evaporator (21), a compressor (23) following the latter in the direction of circulation (22) of the refrigerant, a condenser or liquefier (24) in the outflow region of the outgoing air (25), and a following restrictor (26) for expanding the refrigerant. At the same time, the evaporator (21) is arraged in the air-inflow region of the appliance (10) according to the invention and the liquefier (24) in the air-outflow region of the latter.

There is also provision for disconnecting the liquefier or condenser (24) from the refrigerant circuit, so that an additional condenser (27) is provided for liquefying the refrigerant. Heat is extracted via a water-heat exchanger (28) with a cooling-water regulator (29). The valve (30) serves for shutting off the refrigerant from the condenser, and the valve (31) serves for shutting off the additional line (32).

In addition, a water-level regulator with a float switch (33) and lines (34, 35) with shut-off valves (36) for the water inflow (37) and flow-off (38) are provided. A tank containing an absorbent agent (39) with a shut-off valve (40) and a tank containing a purifying agent (41) with a shut-off valve (42) serves for supplying the absorbent agent and the purifying agent automatically.

The appliance according to the invention works as follows: the incoming air (20) sucked in has a specific air humidity and air temperature. This incoming air is sucked through the evaporator (21) by means of the fan (18), the incoming air cooling and giving off the heat $Q_1$ to the refrigerant in the line (43) of the refrigerant circuit. The refrigerant circuit is based on the known principle of cold production, such as, for example, in a refrigerator.

The air inside the appliance (10), cooled in the evaporator (21) in this way, because of the lower temperature can only absorb or give off less moisture or even no moisture at all, since the absorption of moisture by the air likewise decreases with a falling temperature. Consequently, depending on the degree of cooling of the incoming air in the evaporator (21), the air can absorb more or less moisture in the appliance (10) a result of the wetting of the plate stack or can give off moisture.

Then, the air purified in the appliance (10) by means of the rotating plate stack (13), when it leaves the housing, is guided via condenser or liquefier (24) in which the refrigerant compressed in the compressor (23) is liquefied again and at the same time gives off heat to the outgoing air (25), with the result that this is heated once more. The heat $Q_2$ given off can correspond approximately to the heating $Q_1$ absorbed in the evaporator (21) so that the incoming air and the outgoing air have the same temperature and the same humidity. In this case, purification of the incoming air can take place, without the air being humidified.

The refrigerant liquefied in the condenser (24) is then conveyed via the restrictor (26), before it is supplied to the evaporator (21) once again. The circulation of the refrigerant is indicated by the arrows 22. If the condenser (24) is active, the valve (30) is opened, and the additional condenser (27) is inoperative.

In an alternative mode of operation, the condenser (24) can be disconnected completely or partially from the refrigerant circuit, so that the refrigerant passes via the line (32) and the opened valve (31) to the additional condenser (27), in which the heat $Q_2$ is given off to a water-heat exchanger (28) with a cooling-water regulator (29). In this case, the incoming air (20) cooled in the evaporator (21) is purified inside the housing (10) and is given off to the environment in the form of the outgoing air (25) without additional heating. The appliance then operates as a purifier and cooler, and the air humidity can be maintained or reduced.

By means of a suitable hygrostat sensor (44, 44') at the outlet or inlet of the appliance (10), the desired air humidity of the outgoing air (25) can be regulated by an appropriate adjustment of the evaporator (21) or condenser (24). Depending on the position of the valves (30, 31), the condenser (24) and the additional condenser (27) can also be in operation together at the same time, in order to influence the supply of heat to the outgoing air to a greater or lesser extent by means of the condenser (24). When the condenser (24) is disconnected completely, heat is given off solely to the cooling water by means of the cooling-water regulator (29).

In the housing bottom part (12) the water level is regulated by means of the float switch (33). Water flows in and flows off via the lines (34, 35). The housing bottom part has heat insulation (45).

Depending on the nature of the incoming air to be purified, the adsorbent agent (39) can be dispensed by means of a valve or dispensing device (40). The same applies to further purifying agents (41) by means of valves or dispensing devices (42).

Figure 2:
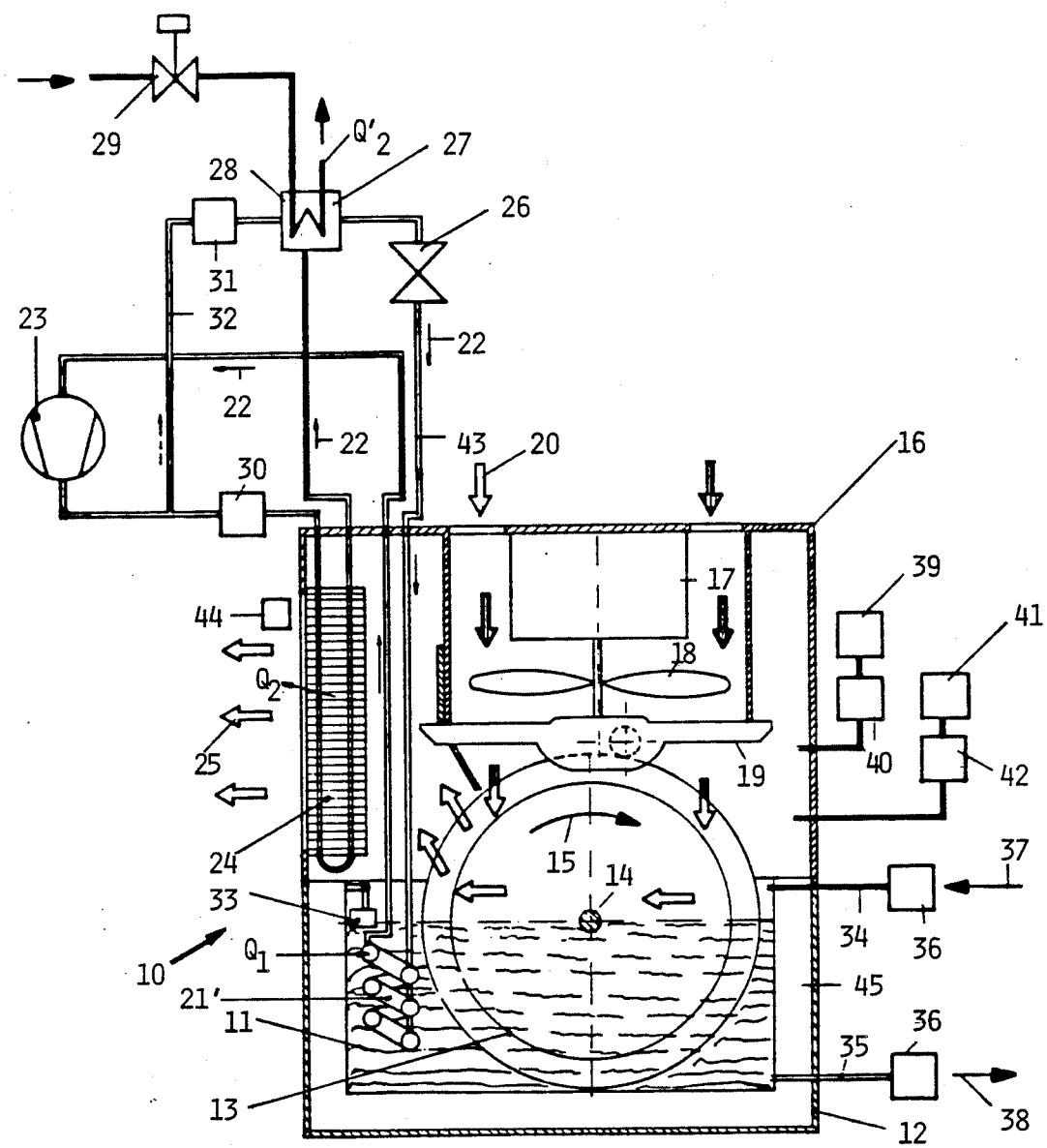
FIG. 2 shows the appliance with an evaporator in the liquid.

The alternative embodiment of the invention illustrated in FIG. 2 shows the evaporator (21') arranged in the purifying liquid. As a result, the liquid (11) is cooled by means of the refrigerant circuit, so that in the upper region of the plate stack (13) the incoming air (20) is not only purified, but at the same time also cooled. The absorption of moisture by the air to be purified is influenced by this cooling. If the air is cooled below the dew point, condensation, that is to say the giving off of water, on the plate stack can also occur. The air humidity is thereby further reduced.

The advantage of the arrangement according to FIG. 2 is that the plate stack serves at the same time as a cooling, purification and condensation surface. Consequently, condensing dirt cannot settle on an external evaporator.

Another advantage of the appliance according to FIG. 2 is that the evaporator (21') can be made very small, since heat transmission or cold transmission in liquid requires a substantially smaller area than heat transmission or cold transmission between a gas exchanger and a heat exchanger.

The invention is not restricted to the exemplary embodiments, but on the contrary also embraces all expert modifications and developments of the features and measures described and/or illustrated.

I claim:

1. An apparatus for treating gases, comprising:
   an entrance;
   an exit;
   means between said entrance and said exit for treating a gas with a water containing liquid;
   means for directing the gas into said treating means via said entrance and directing the gas treated in said treating means from said treating means to the exterior of the apparatus via said exit; and
   means for controlling the temparature and humidity of the gas directed by said directing means, said controlling means including a refrigerant circuit having therein
   an evaporator for cooling the gas as it passes upstream of said exit, thereby to reduce and control the humidity of the gas treated in said treating means as the gas passes from said apparatus via said exit,
   a first condenser means at said exit, cooperating with said evaporator, for heating the gas treated in said treating means as the gas passes from said apparatus via said exit to control the temperature of the gas passing from the apparatus and
   a second condenser means for removing residual heat from said circuit.

2. An apparatus as claimed in claim 1, wherein said evaporator is disposed at said entrance so that the gas passes therethrough toward said treating means.

3. An apparatus as in claim 1, wherein said treating means includes a containment for a supply of the liquid and said evaporator is disposed in said containment so as to be covered by the supply of liquid therein, whereby the liquid is cooled by said evaporator and the gas is cooled by the liquid cooled by said evaporator when the gas is treated with the liquid by said treating means.

4. An apparatus as in claim 1, wherein said refrigerant circuit carries heat received by said evaporator to said condensor to be released to the gas treated in said treating means for heating the gas treated in said treating means, as the gas passes through said exit.

5. An apparatus as in claim 1, wherein said controlling means further comprises means for measuring at least one of the relative humidity of the gas downstream of said first condenser and the relative humidity of the gas upstream of said evaporator and means for controlling the flow of a refrigerant in said refrigerant circuit through said evaporator and said first condenser to permit control of the temperature and relative humidity of the gas downstream of said first condenser.

6. An apparatus as in claim 1, wherein said treating means comprises a gas purification means, including a containment for a supply of the liquid, a plate stack and means for rotating said plate stack through the supply of liquid and through the gas to be treated.

7. An apparatus as in claim 1, wherein said controlling means comprises means for regulating cooling of the gas with said evaporator and with heating of the gas with said first condenser means.

8. An apparatus as in claim 2, wherein said refrigerant circuit further comprises a compressor and a restrictor, said circuit carrying a refrigerant in a closed path from said evaporator to said compressor, from said compressor to said first condenser means, from said first condenser means to said restrictor, and from said restrictor to said evaporator.

9. An apparatus as in claim 8, wherein said second condenser means comprises a water cooled condenser with a heat exchanger and a cooling-water regulator, connected in said circuit in parallel with said first condenser means.

10. An apparatus as in claim 9, wherein said controlling means further comprises a shut-off valve in said circuit for disconnecting said first condenser means from said evaporator, said circuit further comprising a connecting line connecting said compressor to said water-cooled condenser.

11. An apparatus as in claim 6, wherein said containment has a water-level regulator with a float switch and an automatic water inflow and flowoff.

12. An apparatus as in claim 6, further comprising at least one of means for automatically adding absorbent liquid to said containment and means for autmatically adding a purifier to said containment.

13. An apparatus for treating gases, comprising:
an entrance;
an exit;
means between said entrance and said exit for treating a gas with a water containing liquid such that the gas is directly exposed to the liquid;
means for directing the gas into said treating means via said entrance and directing the gas treated in said treating means from said treating means to the exterior of the apparatus via said exit; and
means for controlling the temperature and humidity of the gas directed by said directing means, said controlling means including a refrigerant circuit having therein
an evaporator for cooling the gas as it passes upstream of said exit, thereby to reduce and control the humidity of the gas treated in said treating means as the gas passes from said apparatus via said exit,
a first condenser means at said exit, cooperating with said evaporator, for heating the gas treated in said treating means as the gas passes from said apparatus via said exit to control the temperature of the gas passing from the apparatus,
a compressor between said evaporator and said first condenser means,
means for carrying a refrigerant successively between said evaporator, said compressor and said first condenser such that the refrigerant carries heat received by said evaporator to said first condensor to be released to the gas treated in said treating means for heating the gas treated in said treating means, as the gas passes through said exit, and
a second condenser means for removing residual heat from said circuit;
said controlling means further comprising regulating means, responsive to a condition of the gas at at least one of downstream of said exit and upstream of said entrance, for regulating heating of the gas by said first condenser and cooling of the gas by said evaporator.

14. An apparatus as in claim 13, wherein said second condenser means comprises a water-cooled condenser with a heat exchanger and a cooling-water regulator, connected in said circuit in parallel with said first condenser means.

15. An apparatus as in claim 13, wherein said treating means comprises a gas purification means, including a containment for a supply of the liquid, a plate stack and means for rotating said plate stack through the supply of liquid and through the gas to be treated.

16. An apparatus as in claim 13, wherein said regulating means regulates the flow of the refrigerant in said carrying means through said evaporator and said first condenser means to permit control of the temperature and relative humidity of the gas downstream of said first condenser.

17. A method of treating a flow of gas, comprising the steps of:
cooling the gas by removing heat from the gas to a refrigerant circuit with an evaporator;
purifying the gas with a plate stack rotating in a purifying liquid, moisture being extracted from the gas during said steps of purifying and cooling;
after said steps of cooling and purifying adding to the gas heat from the circuit, including at least some of the heat removed during said steps of cooling and purifying, with a first condenser in the circuit; and
removing residual heat from the circuit with a second condenser in the circuit.

18. A method of treating a flow of gas having an upstream end and a downstream end, comprising the steps of:
between the upstream end and the downstream end, treating the gas with a water containing liquid; and
controlling the temperature and humidity of the gas with a closed refrigerant circuit, said step of controlling including the steps of
between the upstream end and the downstream end, cooling the gas with an evaporator in the closed refrigerant circuit, thereby to reduce and control the humidity of the gas treated during said step of treating, and
heating the gas treated during said step of treating, at the downstream end, with a condenser of the closed refrigerant circuit which cooperates with the evaporator, as the gas passes through the downstream end, thereby to control the temperature of the gas passing through the downstream end.

19. An apparatus as in claim 1, wherein said refrigerant circuit further comprises a water cooled second condenser with a heat exchanger and a cooling-water regulator, connected in said circuit in parallel with said first condenser.

20. An apparatus as in claim 6, wherein said treating means comprises a gas purification means, including a containment for a supply of the liquid, a cylindrical plate stack between said entrance and said supply of liquid and means for rotating said plate stack about an axis, through the supply of liquid and through the gas to be treated, said directing means directing the gas toward the supply of liquid and through said plate stack in directions which are radial with respect to said axis.

* * * * *